US012167193B2

(12) United States Patent
Barros (10) Patent No.: US 12,167,193 B2
(45) Date of Patent: Dec. 10, 2024

(54) DUAL BAND WIRELESS COMMUNICATIONS FOR MULTIPLE CONCURRENT AUDIO STREAMS

(71) Applicant: Google LLC, Mountain View, CA (US)

(72) Inventor: Daniel Barros, Sra da Hora (PT)

(73) Assignee: Google LLC, Mountain View, CA (US)

( * ) Notice: Subject to any disclaimer, the term of this patent is extended or adjusted under 35 U.S.C. 154(b) by 237 days.

(21) Appl. No.: 17/966,229

(22) Filed: Oct. 14, 2022

(65) Prior Publication Data

US 2024/0129658 A1    Apr. 18, 2024

(51) Int. Cl.
*H04R 1/10* (2006.01)

(52) U.S. Cl.
CPC ....... *H04R 1/1041* (2013.01); *H04R 2420/07* (2013.01)

(58) Field of Classification Search
None
See application file for complete search history.

(56) References Cited

U.S. PATENT DOCUMENTS

| 2010/0150383 | A1  | 6/2010  | Sampat |
|---|---|---|---|
| 2010/0232618 | A1* | 9/2010  | Haartsen ................ H04L 1/189 381/80 |
| 2019/0268682 | A1* | 8/2019  | Li .......................... H04R 5/033 |
| 2020/0359134 | A1* | 11/2020 | Tong ....................... H04R 5/04 |
| 2023/0309163 | A1* | 9/2023  | Mitty .................. H04L 65/1069 |

FOREIGN PATENT DOCUMENTS

CN          108 540 144 A      9/2018

* cited by examiner

*Primary Examiner* — Harry S Hong
(74) *Attorney, Agent, or Firm* — Kilpatrick Townsend & Stockton LLP (57) ABSTRACT

Various arrangements for performing wireless device-to-device communication are presented. An audio output device, such as an earbud or pair of earbuds, can establish a connection with an audio source via a first Bluetooth interface that communicates using a Bluetooth communication protocol on a 2.4 GHz Bluetooth frequency band. The audio output device can negotiate that Bluetooth frequency-shifted communication, such as on a 5 or 6 GHz frequency band, is available for use with the audio source. The audio output device may then perform Bluetooth frequency-shifted communication with the audio source such that the audio output device receives an audio stream from the audio source using Bluetooth frequency-shifted communication and the Bluetooth communication protocol.

20 Claims, 4 Drawing Sheets

DUAL BAND WIRELESS COMMUNICATIONS FOR MULTIPLE CONCURRENT AUDIO STREAMS

BACKGROUND

Bluetooth protocols allow for audio to be wirelessly streamed from an audio source to an audio output device, such as earbuds or headphones. Streaming audio to an audio output device is bandwidth intensive. Therefore, if a streaming audio device is streaming audio to an audio output device, insufficient bandwidth may be available for additional data, such as an additional audio stream, to be transmitted to the audio output device by another device with a guaranteed level of quality of service (QoS).

SUMMARY

Various embodiments are described related to an earbud. In some embodiments, an earbud is described. The earbud may comprise a housing. The earbud my comprise a speaker housed by the housing. The earbud may comprise a first Bluetooth interface, housed by the housing, that may communicate using a Bluetooth communication protocol using a 2.4 GHz Bluetooth frequency band. The earbud may comprise a second frequency-shifted Bluetooth interface, housed by the housing, that may communicate using the Bluetooth communication protocol on a Bluetooth frequency-shifted communication band outside of the 2.4 GHz Bluetooth frequency band. The earbud may comprise a processing system, comprising one or more processors, housed by the housing. The processing system may be configured to receive a first audio stream from a first audio source via the second frequency-shifted Bluetooth interface using the Bluetooth communication protocol. The processing system may be configured to receive a second audio stream from a second audio source via the first Bluetooth interface using the Bluetooth communication protocol. The second audio stream may be received while the first audio stream is being received. The processing system may be configured to output the first audio stream and the second audio stream to the speaker.

Embodiments of such a device may include one or more of the following features: the processing system may be further configured to determine that the Bluetooth frequency-shifted communication band may be available for use. The first audio stream from the first audio source may be received via the second frequency-shifted Bluetooth interface based on the determination. The first audio stream and the second audio stream may be output by the speaker simultaneously. Based on a first priority of the first audio stream and a second priority of the second audio stream, output of the first audio stream and the second audio stream may comprise the processing system being configured to output the second audio stream instead of the first audio stream when the second audio stream may be received. The second frequency-shifted Bluetooth interface may comprise a separate local oscillator and separate antenna from the first Bluetooth interface. The Bluetooth frequency-shifted communication band may be a 5 GHz band. The Bluetooth frequency-shifted communication band may be a 6 GHz band. The processing system may be further configured to connect with the second audio source. The processing system may be further configured to reassign the first audio source from the first Bluetooth interface to the second frequency-shifted Bluetooth interface based on connecting with the second audio source.

The first audio stream may be a music stream and the second audio stream may comprise a notification. The first audio stream may use the Bluetooth Low Energy (LE) audio protocol.

In some embodiments, a system is described. The system may comprise a first Bluetooth interface that may communicate using a Bluetooth communication protocol using a 2.4 GHz Bluetooth frequency band. The system may comprise a second frequency-shifted Bluetooth interface that may communicate using the Bluetooth communication protocol on a Bluetooth frequency-shifted communication band outside of the 2.4 GHz Bluetooth frequency band. The system may comprise a processing system, comprising one or more processors, configured to receive a first audio stream from a first audio source via the second frequency-shifted Bluetooth interface using Bluetooth. The processing system may be configured to receive a second audio stream from a second audio source via the first Bluetooth interface using Bluetooth. The second audio stream may be received while the first audio stream is being received. The processing system may be configured to output the first audio stream and the second audio stream concurrently.

Embodiments of such a system may include one or more of the following features: the processing system may be further configured to determine that the Bluetooth frequency-shifted communication band may be available for use. The first audio stream from the first audio source may be received via the second frequency-shifted Bluetooth interface based on the determination. The Bluetooth frequency-shifted communication band may be a 5 GHz band. The Bluetooth frequency-shifted communication band is a 6 GHz band.

In some embodiments, a method of performing wireless device-to-device communication is described. The method may comprise establishing, by an audio output device, a first connection with a first audio source via a first Bluetooth interface that may communicate using a Bluetooth communication protocol on a 2.4 GHz Bluetooth frequency band. The method may comprise negotiating, by the audio output device, that Bluetooth frequency-shifted communication may be available for use with the first audio source. The method may comprise determining, by the audio output device, that Bluetooth frequency-shifted communication may be used for communication with the first audio source at least partially based on negotiating that Bluetooth frequency-shifted communication may be available for use with the first audio source. The method may comprise performing, by the audio output device, Bluetooth frequency-shifted communication with the first audio source such that the audio output device may receive a first audio stream from the first audio source using Bluetooth frequency-shifted communication and the Bluetooth communication protocol.

Embodiments of such a method may include one or more of the following features: the Bluetooth frequency-shifted communication using the Bluetooth communication protocol may be performed using a second Bluetooth interface that may communicate using the Bluetooth communication protocol on a 5 GHz frequency band, a 6 GHz frequency band, or both. The method may further comprise establishing, by the audio output device, a second connection with a second audio source via the first Bluetooth interface that may communicate using the Bluetooth communication protocol on the 2.4 GHz Bluetooth frequency band. The method may further comprise negotiating, by the audio output device, that Bluetooth frequency-shifted communication may not be available with the second audio source. The method may further comprise receiving, by the audio output device, a second audio stream from the second audio source using the first Bluetooth interface. The second audio stream may be received while the first audio stream is being received. The method may further comprise outputting, by the audio output device, the first audio stream and the second audio stream. The audio output device may be an earbud.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Short-range wireless communication standards allow for data to be transferred directly between devices, such as the Bluetooth family of protocols (e.g., classic Bluetooth, Bluetooth Low Energy (BLE), and LE Audio). Bluetooth can be used to stream data from a source device to an output device. A common use case is an audio stream being transferred using Bluetooth (e.g., classic Bluetooth or LE Audio) to an audio output device, such as earbuds (e.g., true wireless earbuds or wireless earbuds, wireless headphones, a wireless speaker).

Conventionally, a single audio stream can be received by an audio output device via Bluetooth or some other device-to-device short-range wireless protocol. That is, a single audio source device, such as a smartphone, transmits a single audio stream to an audio output device, which in turn outputs the audio via a speaker such that a user can listen to the audio stream. However, according to the present teachings, use cases are described in which an audio output device is able to simultaneously receive multiple audio streams, which may be beneficial for many real-world user scenarios. As a first example, a user may wear earbuds that receive a first audio stream from the user's computer. The user could, for example, use the earbuds to participate in an audio or video conference on the user's laptop or desktop computer. At the same time, according to the present teachings, the earbuds may receive a second audio stream from the user's smartphone. The user's smartphone may use the second audio stream to output auditory notifications to the user via the earbuds, such as calendar reminders or indications of incoming calls, emails, and text messages. The second audio stream may be output by the earbuds together with the first audio stream or the first audio stream may be muted or decreased in volume while the second audio stream is being output via one or more speakers of the earbuds. As a second example, a user at an airport may wear earbuds that receive a first audio stream (e.g., music) from the user's smartphone. According to the present teachings, while the earbuds are receiving the first audio stream, a second audio stream can be received by the earbuds from an airport announcement system. This second audio stream may allow the user to hear notifications relevant to the user's flight and general airport announcements. When a relevant notification is received via the second audio stream, the first audio stream may be temporarily paused, muted, or decreased in volume such that the user can hear the notification of the second audio stream. After output of the second audio stream, the first audio stream may have playback continued, be unmuted, or return to its original output volume.

While having an audio output device receive multiple audio streams concurrently would be advantageous, an audio stream uses a significant amount of bandwidth that is allocated for Bluetooth communications. If an audio output device is receiving a first audio stream on a channel of the 2.4 GHz band used for Bluetooth communications, there may be insufficient remaining bandwidth for the audio output device to also receive a second audio stream using the 2.4 GHz band. Therefore, without significant modifications, having an audio output device concurrently receive two active audio streams from different audio sources may not be possible or practical.

In order to allow for an audio output device to concurrently receive multiple audio streams from separate sources, out-of-band Bluetooth communications can be performed between the audio output device and a compatible source device. The audio output device, as detailed herein, can perform frequency-shifted Bluetooth communications using a different frequency band, such as the 5 GHz band, with a compatible source device. By receiving a first audio stream using such frequency-shifted Bluetooth communications, the 2.4 GHz band can be reserved for a second audio stream from a second source, which might not be capable of performing frequency-shifted Bluetooth communications. As detailed herein, during pairing, an inquiry may be performed to determine if both the audio output device and audio source are capable of performing frequency-shifted Bluetooth communications. If so, and possibly based on additional conditions, audio streaming from the audio source to the audio output device may be performed using the frequency-shifted Bluetooth communications. Thus, a second audio stream can be concurrently received using the 2.4 GHz band and both audio streams can be received with a guaranteed level of QoS.

Figure 1:
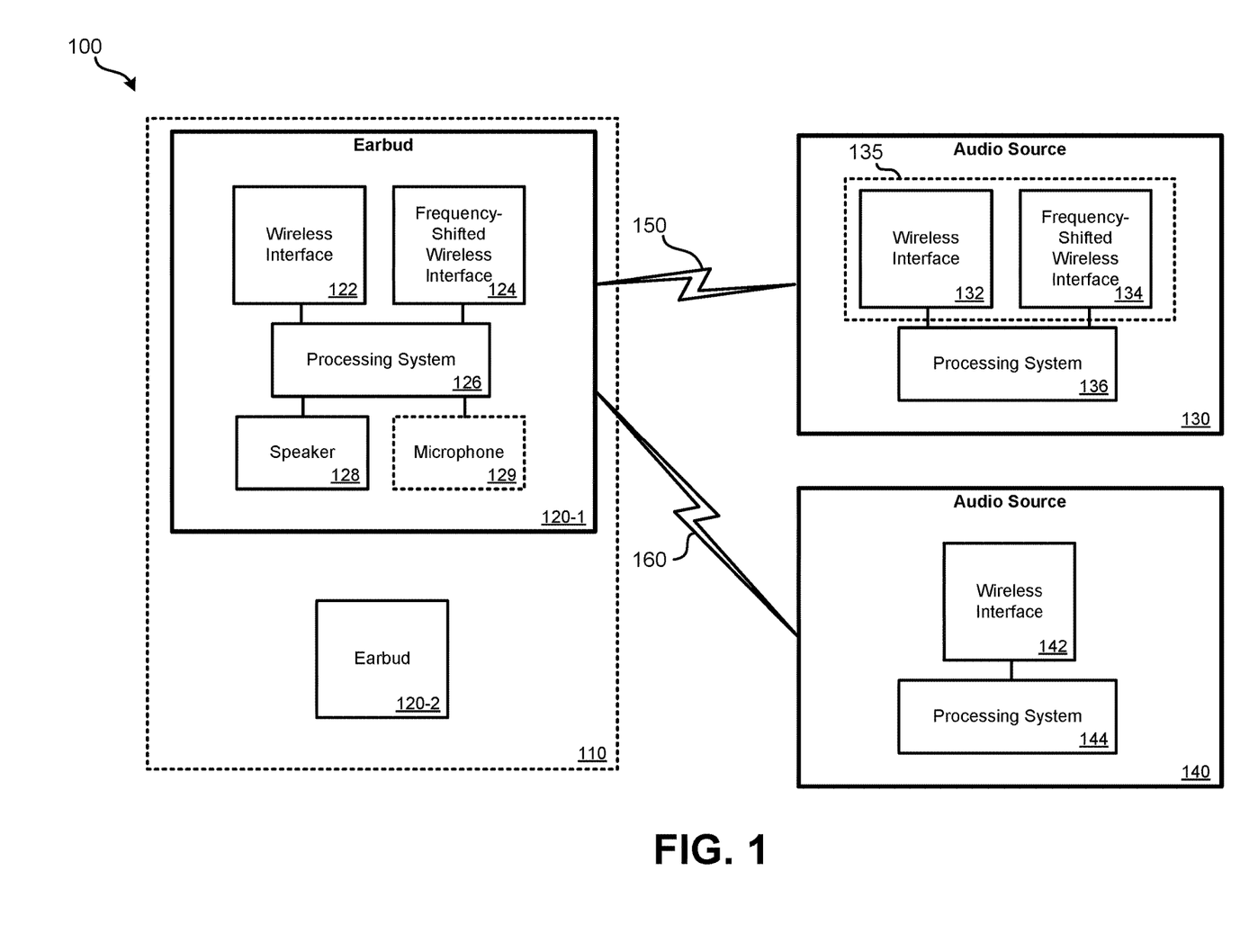
FIG. 1 illustrates a system in which multiple streaming devices are transmitting audio on different bands to an audio output device.

Further detail regarding these embodiments and additional embodiments are provided in relation to the figures. FIG. 1 illustrates a system 100 in which multiple streaming devices are transmitting audio on different bands to an audio output device. System 100 includes: audio output device 110; audio source 130; and audio source 140.

Audio output device 110 can take various forms. Examples of audio output device 110 can include: one or a pair of true wireless earbuds; a pair of wireless earbuds; wireless headphones; and one or more wireless speakers. "True wireless earbuds" refers to a pair of earbuds that do not have any physical connection, such as a wire or band, connecting the two earbuds or with an audio source device. Some true wireless earbuds allow a user to use both earbuds or use a single earbud at a given time. "Wireless earbuds" refers to earbuds that have no physical connection with an audio source device but do have a wire or band that physically connects the earbuds together. "Wireless headphones" refer to a pair of earphones that are connected via a band, which is typically semi-rigid, that is worn over the user's head. A "wireless speaker" uses wireless communication to receive an audio stream and can either use an internal power supply (e.g., one or more batteries) or may have a wire connected to a power source (e.g., a power outlet or external battery pack). A wireless speaker can output audio at a sufficient volume that the wireless speaker is not worn, but rather provides audio at a sufficient volume for multiple users in its vicinity to listen. An example of a wireless speaker could be a wireless speakerphone used for audio or video conferences. For the remainder of this document, true wireless earbuds are used as the example of audio output device 110. However, the arrangements detailed herein can be applied to other forms of audio output device 110 as detailed above.

Components of earbud 120-1 are illustrated. All components of earbud 120-1 can be housed by a housing, which can be made from a rigid or semi-rigid material. Earbud 120-1 can be shaped to be at least partially inserted into a user's ear so that it will stay in place during normal body movements. Earbud 120-1 can include: wireless interface 122; frequency-shifted wireless interface 124; processing system 126; speaker 128; and microphone 129. Wireless interface 122 can be a short-range wireless interface that allows for a device-to-device exchange of data. For example, short-range refers to a distance of up to 10, 15, or 20 meters. Wireless interface 122 can be a Bluetooth interface that allows for data to be exchanged according to a Bluetooth communication standard, such as classic Bluetooth, BLE, or LE audio. Wireless interface 122 can communicate using the 2.4 GHz band, which for Bluetooth spans from 2.4 GHz to 2.4835 GHz. This frequency band can be divided up into a number of channels, such as 80 channels, which are each 1 MHz wide. Bluetooth communications can involve frequent channel changes within the 2.4 GHz band, such as up to 1600 channel changes per second.

Wireless interface 122 can be understood as a standard Bluetooth wireless interface in that it can communicate with other Bluetooth interfaces that conform to the Bluetooth standard. For example, in FIG. 1, audio source 140 has a standard Bluetooth interface, referred to as wireless interface 142. Wireless interface 122 and wireless interface 142 can be paired and can exchange data using a Bluetooth protocol on various channels of the 2.4 GHz band. For example, wireless interface 142 may be used to transmit an audio stream to wireless interface 122.

Frequency-shifted wireless interface 124 is also a short-range wireless interface that allows for a device-to-device exchange of data. Frequency-shifted wireless interface 124 can be a Bluetooth interface that allows for data to be exchanged according to a Bluetooth communication standard, such as classic Bluetooth, BLE, or LE audio. However, frequency-shifted wireless interface 124 does not communicate using the 2.4 GHz band. Rather, frequency-shifted wireless interface 124 communicates using a different available frequency band, such as 5 GHz. The 5 GHz band can be defined as from 5.15 GHz to 5.85 GHz. Within this frequency band, eighty 1 MHz wide channels may be present. The specific frequencies for each channel used within the 5 GHz band can be varied by embodiment. Channel jumping on the 5 GHz band can be performed similarly to channel jumping on the 2.4 GHz band. In some jurisdictions, such as the United States, the 5 GHz band is available for public use. Therefore, as long as other requirements are met, such as broadcast power requirements, using Bluetooth on the 5 GHz band is permissible.

In some embodiments, instead of using the 5 GHz band, a 6 GHz band can be used. For example, the 6 GHz band can be defined as from 5.945 GHz to 6.425 GHz. Within this frequency band, eighty 1 MHz wide channels may also be present. The specific frequencies for each channel used within the 5 GHz band can be varied by embodiment. Channel jumping on the 6 GHz band can be performed similarly to channel jumping on the 2.4 GHz band. In some jurisdictions, such as in Europe, the 6 GHz band is available for public use. Therefore, as long as other requirements are met, such as broadcast power requirements, using Bluetooth on the 6 GHz band is permissible.

In still other embodiments, Bluetooth communications can be shifted in frequency to a higher or lower frequency band relative to the standardized 2.4 GHz band. In various jurisdictions, other frequency bands may have sufficient bandwidth to permit Bluetooth communications to be performed. While from a technical standpoint there are a large number of possible frequency bands that can be used, regulations in the particular jurisdiction in which the devices are operating may need to be observed from a legal standpoint and to prevent interference.

In order to perform frequency-shifted Bluetooth communications, frequency-shifted wireless interface 124 may have several different components than wireless interface 122. Specifically, frequency-shifted wireless interface 124 can include: 1) a local oscillator that operates at the desired frequency band (e.g., 5 GHz); and 2) an antenna that is tuned to the desired frequency band. The local oscillator can be used for modulating signals for transmission and for demodulating signals being received. While use of an antenna tuned to the desired frequency band is optional, use of such an antenna can significantly increase the range of communication. The specifics of the Bluetooth protocol remain otherwise unchanged.

In some embodiments, wireless interface 122 and frequency-shifted wireless interface 124 may be distinct components within the housing of earbud 120-1 implemented using separate chips and separate antennas within the housing of earbud 120-1. Alternatively, separate components (e.g., chips) may be present within earbud 120-1 that use a same antenna, which may be tuned to multiple frequency bands (e.g., 2.4 GHz and 5 GHz bands). In still other embodiments, a combined wireless interface may be implemented that uses one or two antennas that operate on both the standardized Bluetooth and frequency-shifted Bluetooth frequency bands.

Processing system 126 can be in communication with wireless interface 122, frequency-shifted wireless interface 124; speaker 128; and microphone 129. Processing system 126 may include one or more special-purpose or general-purpose processors. Such special-purpose processors may include processors that are specifically designed to perform the functions of the components detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random-access memory (RAM) or a solid-state drive (SSD).

Processing system 126 can be involved in managing which wireless interface is used to communicate with another device and in managing how audio should be output to a user via speaker 128 when multiple audio streams are being received concurrently. Further detail regarding how processing system 126 can manage whether standard Bluetooth or frequency-shifted Bluetooth is used is provided in relation to FIGS. 3 and 4. Processing system 126 can also be used to perform other features, such as noise cancellation and spatial audio (which may involve one or more inertial measurement units (IMUs) being present in audio output device 110).

Speaker 128 is used for outputting audio to a user. Processing system 126 can control the volume, source, and mixing of audio received via wireless interface 122 and frequency-shifted wireless interface 124.

In some embodiments, microphone 129 is present. Microphone 129 can be used to capture audio in the vicinity of earbud 120-1, such as speech of a user of earbud 120-1, and transmit the captured audio via Bluetooth to an audio source. While processing system 126 may temporarily change which audio stream is output to a user via speaker 128, the audio captured using microphone 129 may be continuously streamed to a particular audio source device. Microphone 129 can also be used to capture audio to perform noise cancellation.

Only the details of earbud 120-1 are shown. Earbud 120-1 may be used on its own or with earbud 120-2. For true wireless earbuds, earbud 120-2 may contain the same components as earbud 120-1. In some embodiments, microphone 129 may be present in only one of earbuds 120. Separate communication links (e.g., Bluetooth communication links) can be present between earbud 120-2, audio source 130, and audio source 140. For example, if LE Audio is used as the Bluetooth communication protocol, a separate audio stream may be transmitted to each of earbuds 120. As another example, if classic Bluetooth is used as the Bluetooth communication protocol, another communication stream between earbuds 120-1 and 120-2 may be present to relay an audio stream or earbud 120-2 may "sniff" audio streams 150 and 160 without having a separate communication link active with audio sources 130 and 140.

Audio source 130 includes wireless interface 132; frequency-shifted wireless interface 134; and processing system 136. Examples of audio source 130 can include: a smartphone; a desktop, laptop, or tablet computer; a gaming device; a smart television; a digital music player device; or any other device from which a user may desire to stream audio to earbud 120-1. Audio source 130 includes wireless interface 132, which can communicate with other devices using a standardized protocol using a standardized frequency band, such as Bluetooth (e.g., classic, LE, or LE audio) using the 2.4 GHz band. Therefore, audio source 130 can transmit an audio stream to earbud 120-1 via wireless interface 132 and wireless interface 122.

Additionally, audio source 130 can include frequency-shifted wireless interface 134. Frequency-shifted wireless interface 134 is similar to frequency-shifted wireless interface 124 and can therefore perform communications, such as according to one or more Bluetooth-family protocols, at the same frequency-shifted band, such as 5 GHz or 6 GHz. During initial pairing, audio source 130 may communicate with earbud 120-1 via wireless interface 122 and wireless interface 132. Therefore, standard Bluetooth pairing may be performed using the standardized 2.4 GHz frequency band. As part of this pairing process, indications of various available functions can be exchanged between earbud 120-1 and audio source 130, such as by a particular identifier or flag being exchanged. Therefore, following successful pairing, each of audio source 130 and earbud 120-1 may be aware that the other device has frequency-shifted communications available at a given frequency band.

As an example, a particular manufacturer may enable frequency-shifted Bluetooth communications on their earbuds and smartphones. Therefore, if a user obtains earbuds and a smartphone (or some other form of audio source device, such as a computer) from this manufacturer, the user can benefit from frequency-shifted Bluetooth communication, which would not be available if the user obtained either her earbuds or her smartphone from a different manufacturer.

In some embodiments, wireless interface 132 and frequency-shifted wireless interface 134 are part of a multi-band wireless interface, represented by box 135, that includes oscillators and one or more antennas that allow for communication on the multiple frequency bands. In other embodiments, separate interfaces are present that use a same antenna or separate interfaces are present that use separate antennas.

Processing system 136 may be present as part of audio source 130 and can control communication via wireless interface 132 and frequency-shifted wireless interface 134. Processing system 136 may include one or more special-purpose or general-purpose processors. Such special-purpose processors may include processors that are specifically designed to perform the functions of the components detailed herein, such as detailed in relation to processing system 126.

Audio source 140 includes wireless interface 142 and processing system 144. Examples of audio source 140 can include: an announcement system (e.g., of an airport, transit hub, arena, or other public or private space); a smartphone; a desktop, laptop, or tablet computer; a gaming device; a smart television; a digital music player device; or any other device from which a user may desire to stream audio to earbud 120-1. Audio source 140 includes wireless interface 142, which can communicate with other devices using a standardized protocol using a standardized frequency band, such as Bluetooth (e.g., classic, LE, or LE audio) using the 2.4 GHz band. Therefore, audio source 140 can transmit an audio stream to earbud 120-1 via wireless interface 142 and wireless interface 122. While audio source 140 may also have a frequency-shifted wireless interface, in many embodiments it does not. That is, at least in some embodiments, audio source 140 can only perform Bluetooth communications via the standardized 2.4 GHz band. For example, only one or a small group of manufacturers may implement frequency-shifted wireless interfaces; therefore when earbud 120-1 is communicating with a device manufactured by a different manufacturer, frequency-shifted communication may not be available. Processing system 144 can be in communication with wireless interface 142 and may control communication via wireless interface 142.

As illustrated, audio stream 150 is being transmitted by audio source 130 to earbud 120-1 and audio stream 160 is being transmitted by audio source 140 to earbud 120-1. These audio streams are being transmitted concurrently or simultaneously. While the audio streams are being transmitted concurrently, such as via a Bluetooth protocol, audio stream 150 may be transmitted using the frequency-shifted wireless interfaces 134 and 124 at the frequency-shifted frequency band (e.g., 5 GHz band, 6 GHz band). By using the frequency-shifted frequency band, the standardized 2.4 GHz band used for Bluetooth remains available for audio source 140 to transmit audio stream 160 to earbud 120-1 via wireless interface 122.

At some other time, such as before or after the situation illustrated in FIG. 1 audio source 140 is not transmitting audio stream 160 to earbud 120-1, audio source 130 may use either of the standardized frequency band or the frequency-shifted frequency band for a Bluetooth protocol to transmit audio stream 150 to earbud 120-1.

When multiple audio streams are being received by earbud 120-1, processing system 126 may maintain audio stream management characteristics that define priorities, user preferences, and/or defined rules that govern how multiple audio streams are output. For example, when multiple audio streams are being received, one audio stream may be defined as the primary audio stream and the other audio stream as the secondary audio stream. The primary audio stream may be given preference over the secondary audio stream such that, when the primary audio stream is being received, the secondary audio stream is either paused (if available), muted, or decreased in volume such that the primary audio stream can be output. If the secondary audio stream is decreased in volume, the user can hear both audio streams simultaneously. The user may be permitted to define preferences such as how loud each audio stream should be when both are being output, whether spatial audio should be taken into account (e.g., the direction the user is facing dictates how loud each audio stream is output), what types of audio streams should be defined as primary audio streams, or whether audio should be paused (if available) or only decreased in volume.

The behavior of the microphone may not change when audio stream 150 and audio stream 160 are being received. That is, if audio captured using microphone 129 is being streamed to audio source 130 (e.g., as part of a videoconference), this streaming may not be affected by audio stream 160 being played in place of or over audio stream 150.

Figure 2:
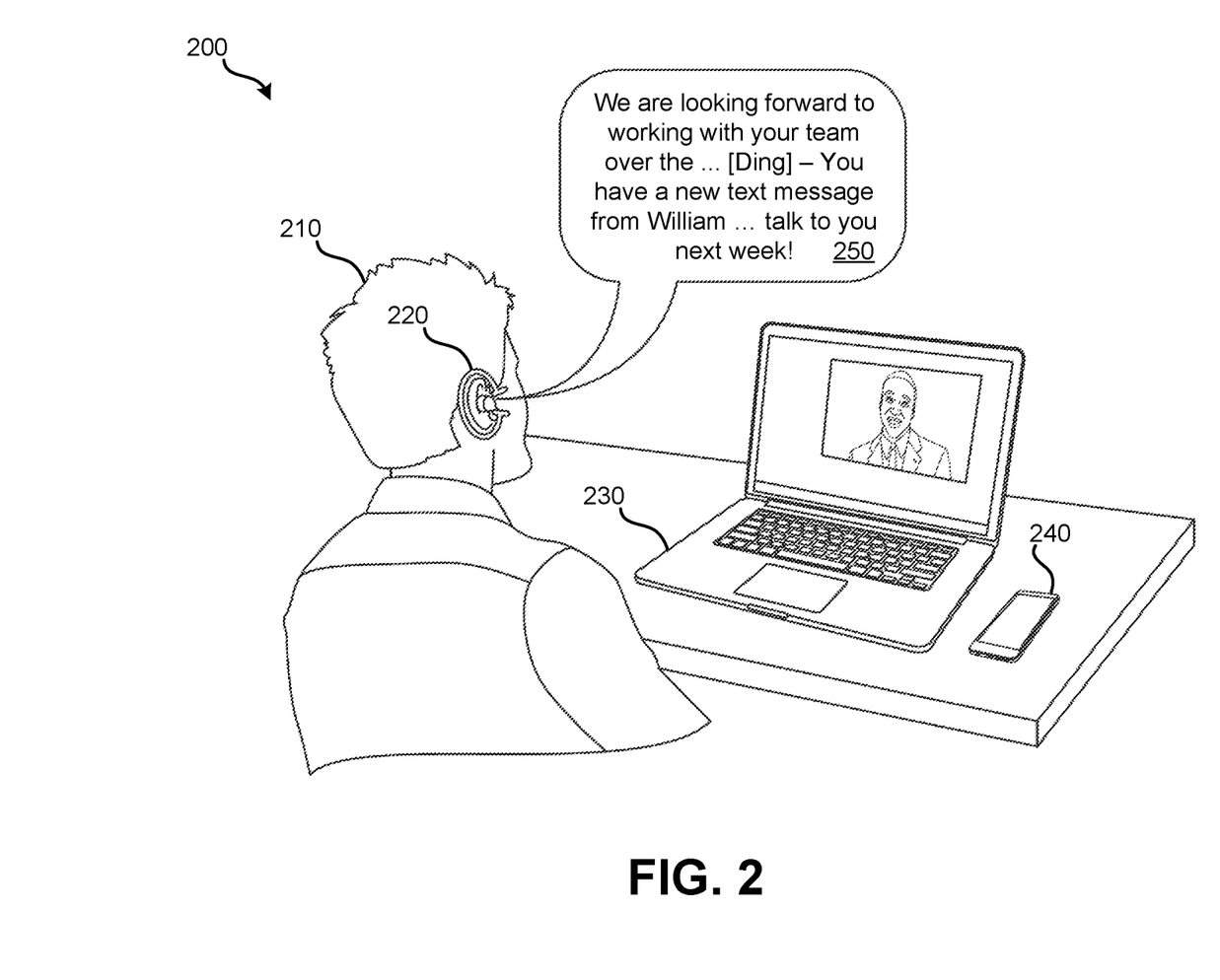
FIG. 2 illustrates an embodiment of a user using true wireless earbuds to simultaneously listen to multiple audio streams from multiple devices.

FIG. 2 illustrates an embodiment 200 of a user using true wireless earbuds to simultaneously listen to multiple audio streams from multiple devices. User 210 can be using audio output device 220, which in this example includes two true wireless earbuds (of which only one is visible in FIG. 2), to receive two audio streams. A first audio stream may be received by audio output device 220 from laptop 230 for a video conference in which user 210 is participating. Smartphone 240 may transmit a second audio stream to audio output device 220. The second audio stream could include, for example, an auditory notification that a text message has been received.

Audio bubble 250 gives an example of the audio which user 210 hears and is output by audio output device 220. In this example, the output audio includes a first audio stream from the video conference from laptop 230: "We are looking forward to working with your team over the next month. Take care and we will talk to you next week!" A second audio stream is received concurrently with the first audio stream. The second audio stream is from smartphone 240 and includes a notification sound (e.g., [Ding]) and synthesized speech: "You have a new text message from William." The second audio stream may replace the first audio stream while the second audio stream is being output, as illustrated in audio bubble 250. As an alternative, the first audio stream may be output concurrently with the second audio stream, such as at a reduced output volume, which could allow user 210 to hear an uninterrupted version of the first audio stream.

Figure 3:
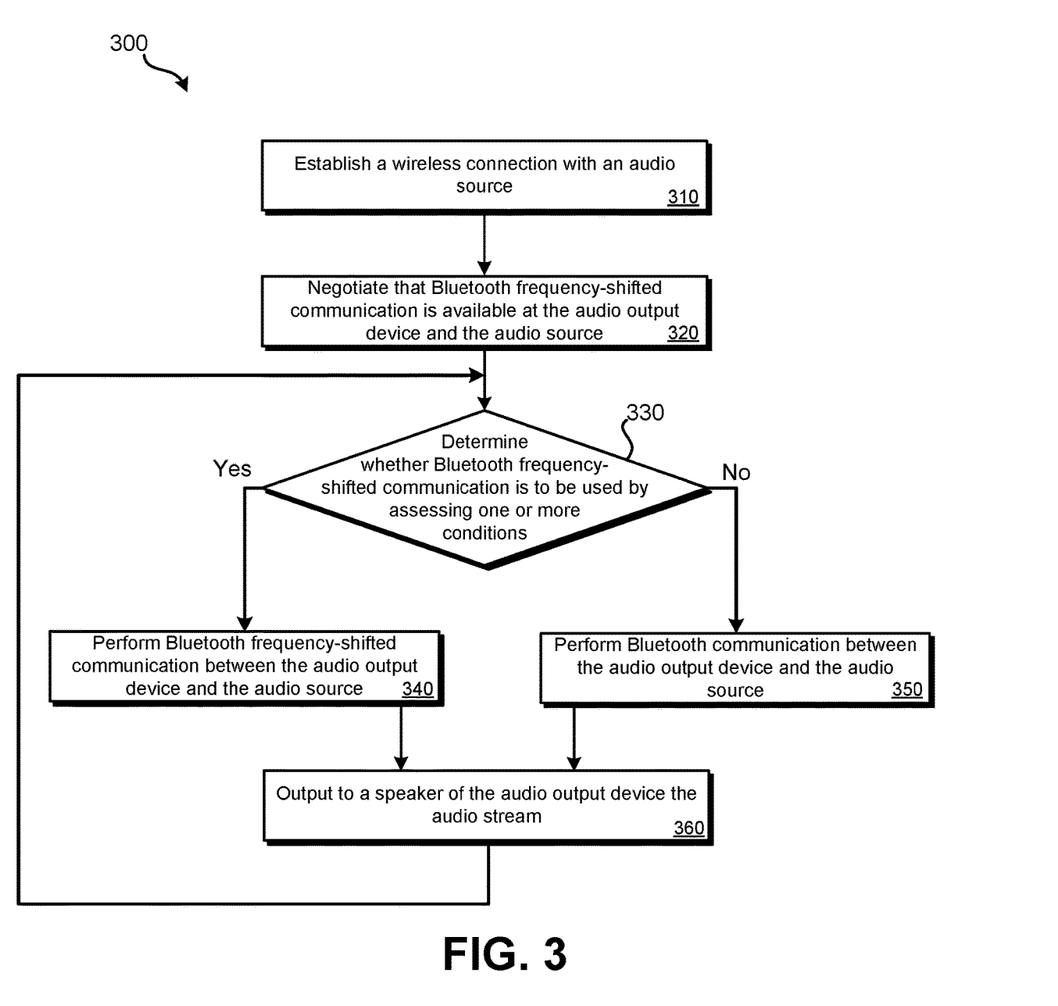
FIG. 3 illustrates an embodiment of a method for using multiple bands for wireless communication.

Various methods can be performed using the system of FIG. 1. FIG. 3 illustrates an embodiment of a method 300 for using multiple frequency bands for multiple concurrent audio streams. Method 300 can be performed using the audio output device of FIG. 1, which may be true wireless earbuds, wireless earbuds, a wireless speakerphone, wireless headphones or a wireless speaker. Method 300 can further be performed using audio source 130 of FIG. 1 that includes both standardized short range wireless communications and frequency-shifted wireless communications. Method 300 can be applied to Bluetooth family communication protocols including classic Bluetooth, BLE, and LE Audio. While method 400 is detailed in relation to Bluetooth communications, method 300 can be applied to other forms of short-range device-to-device communication protocols.

At block 310, a wireless connection may be established between an audio output device and an audio source. For at least the initial wireless connection, such as before pairing has been performed, the connection can be performed via a wireless interface that operates at the standardized frequency band, such as 2.4 GHz for Bluetooth.

At block 320, as part of the pairing process, information is exchanged between the audio output device that indicates capabilities of the audio output device and the audio source. Within this information, such as in the form of an identifier or flag, is data that indicates that the audio output device and the audio source are capable of shifted-frequency Bluetooth communication. Additional information may be exchanged, such as short-term and long-term encryption keys, that allow for data exchanged between the audio output device and the audio source to be encrypted when wirelessly transmitted. Following blocks 310 and 320, if the pairing processing is successful, the audio source and the audio output device are now bonded. For future wireless communication sessions, the full pairing process may not be necessary and only a simplified set of data may be exchanged, such as short-term encryption keys.

Following block 320, both the audio source device and audio output device have data indicating that the other device can perform Bluetooth frequency-shifted communication. However, this does not necessarily mean that the Bluetooth frequency-shifted frequency band will be used. At block 330, a determination is made as to whether Bluetooth frequency-shifted communication is to be used for communication between the audio source and the audio output device. The determination of block 330 may be made by the audio output device. In other embodiments, the determination of block 330 may be made by the audio source. Conditions that may be used to make the determination of block 330 include: what type of data is to be transmitted by the audio source to the audio output device (e.g., an audio stream); whether an audio stream is actively being output to the audio output device by the audio source; the bitrate of the data to be transmitted to the audio output device; whether one or more additional devices are communicating with the audio output device using the standardized Bluetooth frequency band; whether one or more other devices are communicating with the audio output device using the frequency-shifted Bluetooth frequency band; noise measurements (e.g., SNR) on the frequency-shifted Bluetooth frequency band and/or the standardized Bluetooth frequency band.

Some of these conditions may be evaluated in sequence and can take precedence over other conditions. For example, if the audio source device is the only audio source streaming audio to the audio output device, it may default to using Bluetooth frequency-shifted conditions (or the default may be to use the standardized Bluetooth frequency band), assuming the noise on the band permits. Alternatively, a weighting scheme may be used where multiple conditions are evaluated and weighted to determine which frequency band should be used by evaluating a weighted score compared to a threshold value.

If the determination of block 330 indicates that Bluetooth-frequency shifted communications should be used, method 300 proceeds to block 340. At block 340, Bluetooth-frequency shifted communication is performed between the audio output device and the audio source. This can involve an audio stream being transmitted via the Bluetooth frequency-shifted band using a Bluetooth family protocol (e.g., classic Bluetooth, BLE, or LE Audio) to the audio output device. An upstream audio stream, such as including audio from a microphone of the audio output device, may be sent to the audio output device also using the Bluetooth frequency-shifted band. Referring to FIG. 1, these Bluetooth frequency-shifted communications can involve using frequency-shifted wireless interface 124.

If the determination of block 330 indicates that Bluetooth-frequency shifted communications should be used, method 300 proceeds to block 350. At block 350, Bluetooth standardized frequency band communications are performed between the audio output device and the audio source. This can involve an audio stream being transmitted via the standardized Bluetooth frequency band using a Bluetooth family protocol (e.g., classic Bluetooth, BLE, or LE Audio) to the audio output device. An upstream audio stream, such as including audio from a microphone of the audio output device, may be sent to the audio source device also using the standardized Bluetooth frequency band. Referring to FIG. 1, these standardized Bluetooth communications can involve using wireless interface 122.

At block 360, the audio stream received at either block 340 or block 350 is output via one or more speakers of the audio output device. Method 400 assumes that the audio stream is the only audio stream being received by the audio output device. Therefore, no decision needs to be made by the audio output device which audio stream to prioritize or output. After the audio stream has begun being output, conditions may change. Therefore, following block 360, occasionally or periodically, one or more conditions can be re-evaluated. For instance, if a second audio source device has bonded with the audio output device, the audio output device of claim 400 may be transitioned to using the Bluetooth frequency-shifted band (assuming it previously used the standardized Bluetooth band). Conversely, as another example, if significant noise is detected on the Bluetooth frequency-shifted band, the audio output device may be transitioned by the audio output device to using the standardized Bluetooth frequency band for Bluetooth communications (assuming it previously used the frequency-shifted Bluetooth band).

Figure 4:
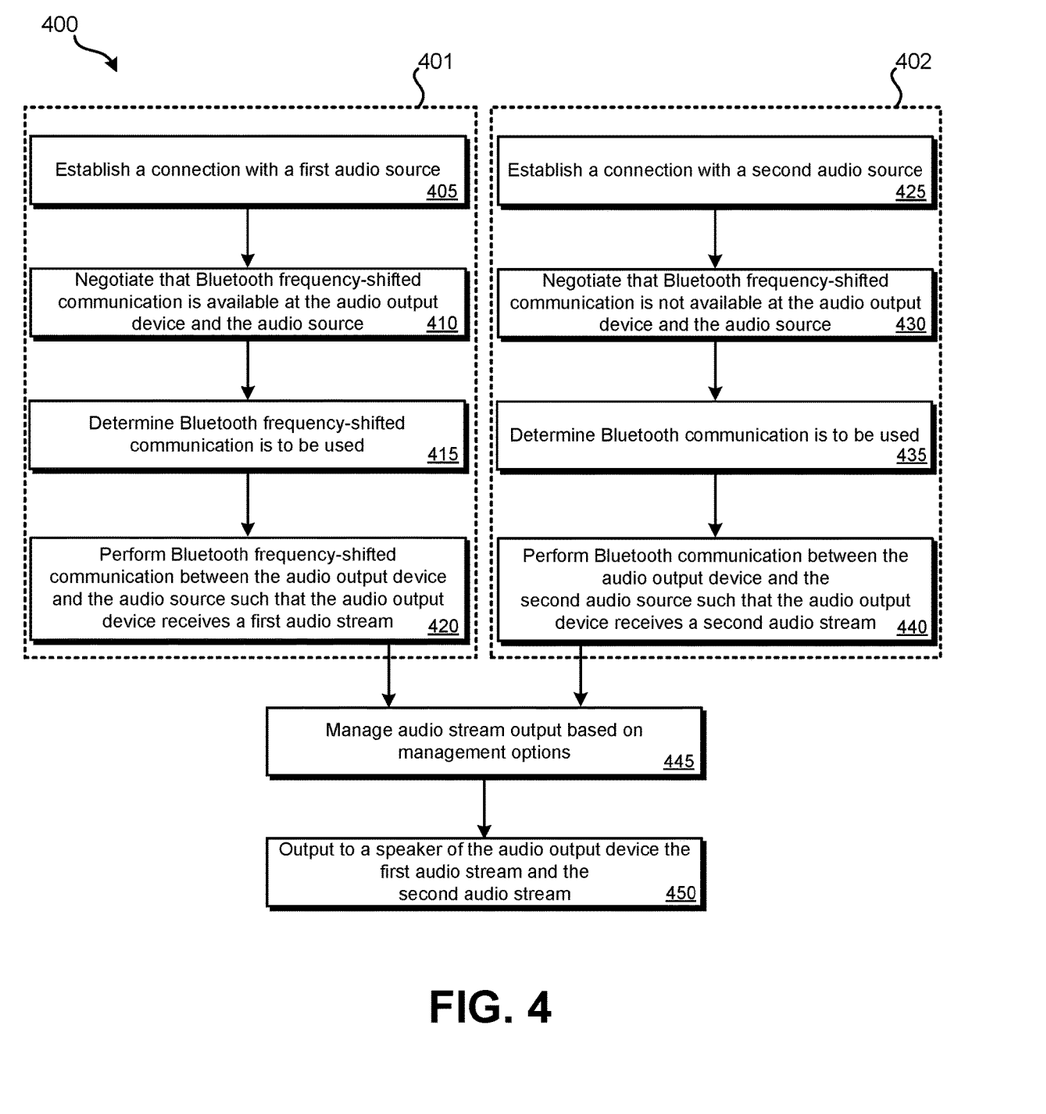
FIG. 4 illustrates another embodiment of a method for using multiple bands for wireless communication.

FIG. 4 illustrates an embodiment of method 400 for using multiple bands for wireless communication with multiple audio sources. Method 400 can be performed using the audio output device of FIG. 1, which may be true wireless earbuds, a wireless speakerphone, wireless earbuds, wireless headphones or a wireless speaker. Method 400 can further be performed using audio source 130 and audio source 140 of FIG. 1. In some embodiments, audio source 140 also has the ability to use frequency-shifted Bluetooth communications. Method 400 can be applied to Bluetooth family communication protocols including classic Bluetooth, BLE, and LE Audio. While method 400 is detailed in relation to Bluetooth communications, method 400 can be applied to other forms of short-range device-to-device communication protocols.

In method 400, two audio streams are transmitted concurrently to the audio output device. First audio source blocks 401 may be performed before, after, or concurrently with second audio source blocks 402. Different Bluetooth family protocols can be used for each stream or the same Bluetooth family protocol can be used.

At block 405, a wireless connection may be established between an audio output device and a first audio source. For at least the initial wireless connection, such as before pairing has been performed, the connection can be performed via a wireless interface that operates at the standardized frequency band, such as 2.4 GHz for Bluetooth.

At block 410, as part of the pairing process between the first audio source device and the audio output device, information is exchanged between the devices that indicates capabilities of the audio output device and the first audio source. Within this information, such as in the form of an identifier or flag, is data that indicates that the audio output device and the first audio source are capable of shifted-frequency Bluetooth communication. Additional information may be exchanged, such as short-term and long-term encryption keys, that allow for data exchanged between the audio output device and the audio source to be encrypted when wirelessly transmitted. Following blocks 405 and 410, if the pairing processing is successful, the audio source and the audio output device are now bonded. For future wireless communication sessions, the full pairing process may not be necessary and only a simplified set of data may be exchanged to bond, such as short-term encryption keys. In such arrangements, data from the initial pairing process may be stored by each device.

Following block 410, both the audio source device and audio output device have data indicating that the other device can perform Bluetooth frequency-shifted communication, such as using the 5 GHz or 6 GHz band. At block 415, a determination is made as to whether Bluetooth frequency-shifted communication is to be used for communication between the audio source and the first audio output device. The determination of block 415 may be made by the audio output device. Conditions that may be used to make the determination of block 415 include those detailed in relation to block 330. In method 400, at least when the second audio stream is being transmitted at block 440, block 415 results in frequency-shifted Bluetooth communications being used with the first audio source device.

At block 420, Bluetooth-frequency shifted communication is performed between the audio output device and the first audio source. This can involve a first audio stream being transmitted via the Bluetooth frequency-shifted band using a Bluetooth family protocol (e.g., classic Bluetooth, BLE, or LE Audio) to the audio output device by the first audio source. An upstream audio stream, such as including audio from a microphone of the audio output device, may be sent to the first audio source also using the Bluetooth frequency-shifted band. Referring to FIG. 1, these Bluetooth frequency-shifted communications can involve using frequency-shifted wireless interface 124.

At block 425, a second wireless connection may be established between the audio output device and a second audio source. The connection can be performed via a wireless interface that operates at the standardized frequency band, such as 2.4 GHz for Bluetooth.

At block 430, as part of the pairing process between the second audio source device and the audio output device, information is exchanged between the devices that indicates capabilities of the audio output device and the second audio source. Based on this information, a determination is made that the second audio source is not capable of shifted-frequency Bluetooth communication. Additional information may be exchanged, such as short-term and long-term encryption keys, that allow for data exchanged between the audio output device and the audio source to be encrypted when wirelessly transmitted. Following blocks 425 and 430, if the pairing processing is successful, the audio source and the audio output device are now bonded. For future wireless communication sessions, the full pairing process may not be necessary and only a simplified set of data may be exchanged, such as short-term encryption keys. In other embodiments, block 430 can result in a determination similar to block 410 in that both the second audio source device and the audio output device are capable of frequency-shifted Bluetooth communications.

Following block 430, based on the second audio source device not being capable of frequency-shifted Bluetooth communications, a determination to use standardized Bluetooth communications is made. In another embodiment in which Bluetooth frequency-shifted communications were determined to be available at block 430, the use of the standardized Bluetooth frequency band at block 435 is made based on one or more of the conditions detailed in relation to block 330. For example, due to the first audio source device using the Bluetooth frequency-shifted frequency band, the second audio source may be set to use the standardized Bluetooth frequency band.

Referring to FIG. 3, in some embodiments the first audio source initially is assigned to use the standardized Bluetooth frequency band; however, when the standardized Bluetooth frequency band is determined to be used for the second audio source device at block 435, the audio output device reassigns the first audio source device to the frequency-shifted frequency band for Bluetooth communications to free up the standardized Bluetooth frequency band for the second audio source.

At block 440, standard Bluetooth communications are performed between the audio output device and the second audio source. This can involve a second audio stream being transmitted via the standardized Bluetooth frequency band using a Bluetooth family protocol (e.g., classic Bluetooth, BLE, or LE Audio) to the audio output device by the second audio source. If no upstream audio is being transmitted to the first audio source, an upstream audio stream, such as including audio from a microphone of the audio output device, may be sent to the second audio source also using the standardized Bluetooth frequency band. Referring to FIG. 1, these standard Bluetooth communications can involve using wireless interface 122.

At block 445, two audio streams are being received by the audio output device from two separate audio sources. The audio output device may need to make decisions as to how each audio stream is to be output. Management characteristics can be used to determine how the multiple audio streams received via standardized Bluetooth and frequency-shifted Bluetooth should be output. Such management options can include: selecting one of the audio streams for output; outputting the audio streams concurrently at the same volume; outputting the audio streams at different volumes (e.g., decreasing the volume of one audio stream while the other audio stream is being output); pausing one of the audio streams while the other audio stream is output; using spatial orientation and/or position to determine the volume of each audio stream or which audio stream is output; using defined rules and/or user preferences to determine which or at what volume each audio stream should be output. For instance, a defined rule at the audio output device may indicate that an audio stream indicated to include auditory notifications are given preference over an audio stream that is indicated to be music. As an example of a user preference, a user may define that a particular device is permitted to interrupt audio streams of another device. Such a preference may be stored by the audio output device. For example, the user may indicate that auditory notifications from a smartphone are to be output over an audio stream being transmitted by a laptop computer to the audio output device.

The audio output device's defaults or the user may further define how audio captured by a microphone of audio output device is to be handled based on which audio stream is being output (or played at a higher volume). For example, regardless of which audio stream is being output, the upstream audio stream from the audio output device's microphone may remain locked to being transmitted to one of the audio source devices.

At block 450, one or both of the audio streams received at blocks 420 and 440 is output to a user (or multiple users) via one or more speakers of the audio output device in accordance with the management options assessed at block 445 by the audio output device.

While methods 300 and 400 are focused on audio streams, the same methods may be applied to other types of data that would benefit from a device receiving multiple concurrent data streams from multiple source devices, for example, an arrangement that sends an output device multiple video streams via Bluetooth from multiple source devices.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known, processes, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. An earbud, comprising:
a housing;
a speaker housed by the housing;
a first Bluetooth interface, housed by the housing, that communicates using a Bluetooth communication protocol using a 2.4 GHz Bluetooth frequency band;
a second frequency-shifted Bluetooth interface, housed by the housing, that communicates using the Bluetooth communication protocol on a Bluetooth frequency-shifted communication band outside of the 2.4 GHz Bluetooth frequency band; and
a processing system, comprising one or more processors, housed by the housing, configured to:
receive a first audio stream from a first audio source via the second frequency-shifted Bluetooth interface using the Bluetooth communication protocol;
receive a second audio stream from a second audio source via the first Bluetooth interface using the Bluetooth communication protocol, wherein the second audio stream is received while the first audio stream is being received; and
output the first audio stream and the second audio stream to the speaker.

2. The earbud of claim 1, wherein the processing system is further configured to:
determine that the Bluetooth frequency-shifted communication band is available for use, wherein the first audio stream from the first audio source is received via the second frequency-shifted Bluetooth interface based on the determination.

3. The earbud of claim 1, wherein the first audio stream and the second audio stream are output by the speaker simultaneously.

4. The earbud of claim 1, wherein, based on a first priority of the first audio stream and a second priority of the second audio stream, output of the first audio stream and the second audio stream comprises the processing system being configured to:
output the second audio stream instead of the first audio stream when the second audio stream is received.

5. The earbud of claim 1, wherein the second frequency-shifted Bluetooth interface comprises a separate local oscillator and separate antenna from the first Bluetooth interface.

6. The earbud of claim 1, wherein the Bluetooth frequency-shifted communication band is a 5 GHz band.

7. The earbud of claim 1, wherein the Bluetooth frequency-shifted communication band is a 6 GHz band.

8. The earbud of claim 1, wherein the processing system is further configured to:
connect with the second audio source; and
reassign the first audio source from the first Bluetooth interface to the second frequency-shifted Bluetooth interface based on connecting with the second audio source.

9. The earbud of claim 1, wherein the first audio stream is a music stream and the second audio stream comprises a notification.

10. The earbud of claim 1, wherein the first audio stream uses the Bluetooth Low Energy (LE) audio protocol.

11. A system, comprising:
a first Bluetooth interface that communicates using a Bluetooth communication protocol using a 2.4 GHz Bluetooth frequency band;
a second frequency-shifted Bluetooth interface that communicates using the Bluetooth communication protocol on a Bluetooth frequency-shifted communication band outside of the 2.4 GHz Bluetooth frequency band; and
a processing system, comprising one or more processors, configured to:
receive a first audio stream from a first audio source via the second frequency-shifted Bluetooth interface using Bluetooth;
receive a second audio stream from a second audio source via the first Bluetooth interface using Bluetooth, wherein the second audio stream is received while the first audio stream is being received; and
output the first audio stream and the second audio stream concurrently.

12. The system of claim 11, wherein the processing system is further configured to:
determine that the Bluetooth frequency-shifted communication band is available for use, wherein the first audio stream from the first audio source is received via the second frequency-shifted Bluetooth interface based on the determination.

13. The system of claim 11, wherein the Bluetooth frequency-shifted communication band is a 5 GHz band.

14. The system of claim 11, wherein the Bluetooth frequency-shifted communication band is a 6 GHz band.

15. A method of performing wireless device-to-device communication, comprising:
establishing, by an audio output device, a first connection with a first audio source via a first Bluetooth interface that communicates using a Bluetooth communication protocol on a 2.4 GHz Bluetooth frequency band;
negotiating, by the audio output device, that Bluetooth frequency-shifted communication is available for use with the first audio source;
determining, by the audio output device, that Bluetooth frequency-shifted communication is to be used for communication with the first audio source at least partially based on negotiating that Bluetooth frequency-shifted communication is available for use with the first audio source; and
performing, by the audio output device, Bluetooth frequency-shifted communication with the first audio source such that the audio output device receives a first audio stream from the first audio source using Bluetooth frequency-shifted communication and the Bluetooth communication protocol.

16. The method of claim 15, wherein the Bluetooth frequency-shifted communication using the Bluetooth communication protocol is performed using a second Bluetooth interface that communicates using the Bluetooth communication protocol on a 5 GHz frequency band, a 6 GHz frequency band, or both.

17. The method of claim 15, further comprising:
establishing, by the audio output device, a second connection with a second audio source via the first Bluetooth interface that communicates using the Bluetooth communication protocol on the 2.4 GHz Bluetooth frequency band.

18. The method of claim 17, further comprising:
negotiating, by the audio output device, that Bluetooth frequency-shifted communication is not available with the second audio source.

19. The method of claim 18, further comprising:
receiving, by the audio output device, a second audio stream from the second audio source using the first Bluetooth interface, wherein the second audio stream is received while the first audio stream is being received; and
outputting, by the audio output device, the first audio stream and the second audio stream.

20. The method of claim 15, wherein the audio output device is an earbud.

* * * * *